United States Patent
Lin et al.

(10) Patent No.: US 12,238,790 B2
(45) Date of Patent: Feb. 25, 2025

(54) MA PDU SESSION AND USER PLANE RESOURCE ESTABLISHMENT FOR DATA TRANSMISSION

(71) Applicant: MEDIATEK INC., Hsin-Chu (TW)

(72) Inventors: Yuan-Chieh Lin, Hsin-Chu (TW); Chien-Chun Huang Fu, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 0 days.

(21) Appl. No.: 18/532,333

(22) Filed: Dec. 7, 2023

(65) Prior Publication Data
US 2024/0107599 A1    Mar. 28, 2024

Related U.S. Application Data

(63) Continuation of application No. 17/478,578, filed on Sep. 17, 2021, now abandoned.

(Continued)

(51) Int. Cl.
*H04W 76/00* (2018.01)
*H04W 28/10* (2009.01)
(Continued)

(52) U.S. Cl.
CPC ........... *H04W 76/10* (2018.02); *H04W 28/10* (2013.01); *H04W 60/04* (2013.01); *H04W 84/042* (2013.01)

(58) Field of Classification Search
None
See application file for complete search history.

(56) References Cited

U.S. PATENT DOCUMENTS

2009/0305668 A1* 12/2009 Ahn ............... H04W 12/12
                                                          455/410
2020/0236727 A1   7/2020 Salkintzis ......... H04W 76/15
(Continued)

FOREIGN PATENT DOCUMENTS

CN        111787590 A      7/2018
WO     WO 2019/160278      2/2018
WO     WO2019160278 A1     1/2019

OTHER PUBLICATIONS

China Intellectual Property Office Action 202111213601.7, dated Feb. 8, 2024 (10 pages).

(Continued)

*Primary Examiner* — Abdelillah Elmejjarmi
(74) *Attorney, Agent, or Firm* — Helen Mao; Imperium Patent Works (57) ABSTRACT

A method to establish and activate an MA PDU session for data transmission over a selected access is proposed. UE initiates a UE-requested PDU session establishment procedure. Once the UE receives a PDU SESSION ESTABLISHMENT ACCEPT message with ATSSS container IE, the UE can consider the MA PDU session has been activated and user plane resources are successfully established on the selected access. A method to convert an SA PDU session to an MA PDU session for data transmission over a selected access is proposed. UE initiates a UE-requested PDU session modification procedure. Once the UE receives a PDU SESSION MODIFICATION COMMAND message with ATSSS container IE, the UE can consider the MA PDU session has been converted from the SA PDU session and user plane resources are successfully established on the selected access.

12 Claims, 5 Drawing Sheets

Related U.S. Application Data (60) Provisional application No. 63/093,326, filed on Oct. 19, 2020.

(51) Int. Cl.
*H04W 60/04* (2009.01)
*H04W 76/10* (2018.01)
*H04W 84/04* (2009.01)

(56) References Cited

U.S. PATENT DOCUMENTS

2021/0037585 A1* 2/2021 Youn ............... H04W 76/30
2022/0361272 A1* 11/2022 Sugawara ............. H04W 76/12

OTHER PUBLICATIONS

Taiwan IP Office search report and written opinion on related application 110138493 mailed on Feb. 9, 2022 (6 pages) (no English translation readily available).

* cited by examiner

MA PDU SESSION AND USER PLANE RESOURCE ESTABLISHMENT FOR DATA TRANSMISSION

CROSS REFERENCE TO RELATED APPLICATIONS

This application is a continuation, and claims priority under 35 U.S.C. § 120 from nonprovisional U.S. patent application Ser. No. 17/478,578, entitled "MA PDU SESSION AND USER PLANE RESOURCE ESTABLISHMENT FOR DATA TRANSMISSION", filed on Sep. 17, 2021, the subject matter of which is incorporated herein by reference. Application Ser. No. 17/478,578, in turn, claims priority under 35 U.S.C. § 119 from U.S. Provisional Application No. 63/093,326, entitled "MA PDU Fail to see UP resource establishment", filed on Oct. 19, 2020, the subject matter of which is incorporated herein by reference.

TECHNICAL FIELD

The disclosed embodiments relate generally to wireless communication, and, more particularly, to method of handling of Multi-Access (MA) PDU session and user plane resource establishment for data transmission.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

In 5G/NR, a Protocol Data Unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G Access Network (e.g., a 3GPP radio access network (RAN), or a non-3GPP RAN). The network/UE can initiate different PDU session procedures, e.g., PDU session establishment, PDU session modification, and PDU session release.

Operators are seeking ways to balance data traffic between mobile cellular networks and non-3GPP access in a way that is transparent to users and reduces mobile network congestion. In 5GS, UEs that can be simultaneously connected to both 3GPP access and non-3GPP access (using 3GPP NAS signalling), thus the 5GS is able to take advantage of these multiple accesses to improve the user experience, optimize the traffic distribution across various accesses. Accordingly, 3GPP introduced Multi-Access (MA) PDU session in 5GS. A MA PDU session uses one 3GPP access network or one non-3GPP access network at a time, or simultaneously one 3GPP access network and one non-3GPP access network.

For a UE that is registered over both 3GPP access and non-3GPP access in the same PLMN, the UE can initiate a UE-requested PDU session establishment procedure by sending a PDU SESSION ESTABLISHMENT REQUEST over a selected access to the network in order to activate an MA PDU session. However, when the UE receives a PDU SESSION ESTABLISHMENT ACCEPT message, the UE cannot consider the MA PDU session is successfully established. The UE needs to wait for "indication of user plane resources are established in 3GPP access" and "indication of user plane resources are established in non-3GPP access", then the UE can consider the MA PDU session is successfully established.

Similarly, for a UE that is registered over both 3GPP access and non-3GPP access in the same PLMN, the UE can initiate a UE-requested PDU session modification procedure by sending a PDU SESSION MODIFICATION REQUEST over a selected access to the network in order to convert an SA (single access) PDU session to an MA PDU session. However, when the UE receives the PDU SESSION MODIFICATION COMMAND message, the UE cannot consider the PDU session is successfully converted to an MA PDU session. The UE needs to wait for "indication of user plane resources are established in 3GPP access" and "indication of user plane resources are established in non-3GPP access", then the UE can consider the PDU session is successfully converted to the MA PDU session.

A solution is sought to enable the UE to activate or convert an MA PDU session for data transmission during a PDU session establishment procedure or a PDU session modification procedure.

SUMMARY

A method to establish and activate an MA PDU session for data transmission over a selected access is proposed. In one embodiment, UE initiates a UE-requested PDU session establishment procedure by sending a PDU SESSION ESTABLISHMENT REQUEST over a selected access to the NW in order to activate an MA PDU session. Once the UE receives the PDU SESSION ESTABLISHMENT ACCEPT message with ATSSS container IE, the UE can consider the MA PDU session has been activated and user plane resources are successfully established on the selected access, and start data transmission over the selected access of the MA PDU session without receiving explicit indications from lower layer that the user plane resources are established on 3GPP access and non-3GPP access.

A method to convert an SA PDU session to an MA PDU session for data transmission over a selected access is proposed. In one embodiment, UE initiates a UE-requested PDU session modification procedure by sending a PDU SESSION MODIFICATION REQUEST over a selected access to the NW in order to convert an SA PDU session to an MA PDU session. Once the UE receives the PDU SESSION MODIFICATION COMMAND message with ATSSS container IE, the UE can consider the MA PDU session has been converted from the SA PDU session and user plane resources are successfully established on 3GPP (the selected access), and start data transmission over 3GPP (the selected access) of the MA PDU session without receiving explicit indications from lower layer that the user plane resources are established on 3GPP access and non-3GPP access.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
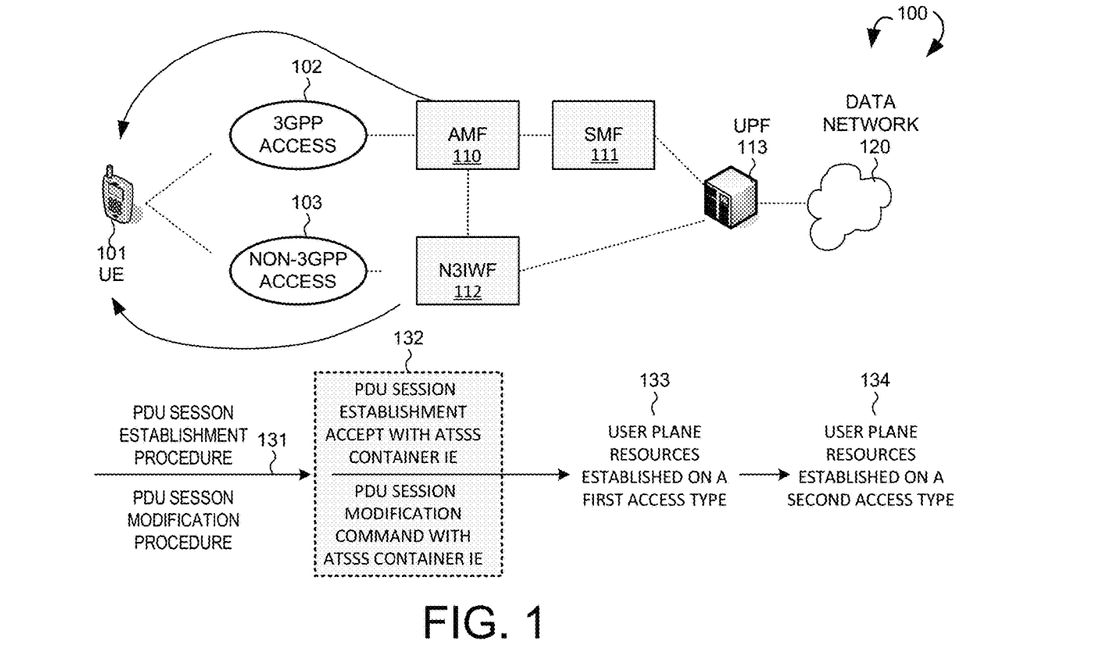
FIG. 1 illustrates an exemplary 5G network supporting early data transmission for a Multi-Access Protocol Data Unit (MA PDU) session establishment or a MA PDU session modification procedure in accordance with one novel aspect.

FIG. 1 illustrates an exemplary 5G network 100 supporting early data transmission for a Multi-Access Protocol Data Unit (MA PDU) session establishment or a MA PDU session modification procedure in accordance with one novel aspect. 5G network 100 comprises a user equipment UE 101, a 3GPP radio (e.g., NR) access network RAN 102, a non-3GPP radio access network RAN 103, an Access and Mobility Management Function (AMF) 110, a Session Management Function (SMF) 111, an Non-3GPP Interworking Function (N3IWF) 112, a User Plane Function (UPF) 113, and a data network 120. The AMF communicates with the base station, SMF and UPF for access and mobility management of wireless access devices in mobile communication network 100. The SMF is primarily responsible for interacting with the decoupled data plane, creating, updating and removing Protocol Data Unit (PDU) sessions and managing session context with the UPF. The N3IWF functionality interfaces to 5G core network control plane functions, responsible for routing messages outside 5G RAN.

In Access Stratum (AS) layer, RAN provides radio access for UE 101 via a radio access technology (RAT). In Non-Access Stratum (NAS) layer, AMF and SMF communicate with RAN and 5GC for access and mobility management and PDU session management of wireless access devices in 5G network 100. 3GPP Radio access network RAN 102 may include base stations (gNBs) providing radio access for UE 101 via various 3GPP RATs including 5G, 4G, and 3G/2G. Non-3GPP radio access network RAN 103 may include access points (APs) providing radio access for UE 101 via non-3GPP including WiFi. UE 101 can obtain access to data network 120 through 3GPP access 102, AMF 110, SMF 111, and UPF 113. UE 101 can obtain access to data network 120 through non-3GPP access 103, N3IWF 112, AMF 110, SMF 111, and UPF 113. UE 101 may be equipped with a single radio frequency (RF) module or transceiver or multiple RF modules or transceivers for services via different RATs/CNs. UE 101 may be a smart phone, a wearable device, an Internet of Things (IoT) device, a tablet, etc.

In 5G/NR, a Protocol Data Unit (PDU) session defines the association between the UE and the data network that provides a PDU connectivity service. Each PDU session can be established over a 3GPP RAN, or over a non-3GPP RAN for radio access. 5G Session management (5GSM) for PDU sessions over both 3GPP access and non-3GPP access are managed by AMF and SMF via NAS signaling. In 5GS, UEs that can be simultaneously connected to both 3GPP access and non-3GPP access (using 3GPP NAS signalling), thus the 5GS is able to take advantage of these multiple accesses to improve the user experience, optimize the traffic distribution across various accesses. Accordingly, 3GPP introduced Multi-Access (MA) PDU session in 5GS. A MA PDU session uses one 3GPP access network or one non-3GPP access network at a time, or simultaneously one 3GPP access network and one non-3GPP access network. In addition, the UE and the network can support Access Traffic Steering Switching and Splitting (ATSSS) functionalities to distribute traffic over 3GPP access and non-3GPP access for the established MA PDU session.

For UE 101 that is registered over both 3GPP access and non-3GPP access in the same PLMN, the UE can initiate a UE-requested PDU session establishment procedure by sending a PDU SESSION ESTABLISHMENT REQUEST message over a selected access to the NW in order to activate an MA PDU session (step 131). However, in the existing art, when the UE receives a PDU SESSION ESTABLISHMENT ACCEPT message with ATSSS container IE (step 132), the UE cannot consider the MA PDU session is successfully established. The UE needs to wait for "indication of user plane resources are established in 3GPP access" (step 133) and "indication of user plane resources are established in non-3GPP access" (step 134), then the UE can consider the MA PDU session is successfully established.

Similarly, for UE 101 that is registered over both 3GPP access and non-3GPP access in the same PLMN, the UE can initiate a UE-requested PDU session modification procedure by sending a PDU SESSION MODIFICATION REQUEST message over a selected access to the NW in order to convert an SA PDU session to an MA PDU session (step 131). However, in the existing art, when the UE receives the PDU SESSION MODIFICATION COMMAND message with ATSSS container IE (step 132), the UE cannot consider the PDU session is successfully converted to an MA PDU session. The UE needs to wait for "indication of user plane resources are established in 3GPP access" (step 133) and "indication of user plane resources are established in non-3GPP access" (step 134), then the UE can consider the PDU session is successfully converted to the MA PDU session.

In accordance with one novel aspect, once UE 101 receives the PDU SESSION ESTABLISHMENT ACCEPT message with ATSSS container IE (step 132), the UE can consider the MA PDU session has been activated and the user plane resources are successfully established on the selected access, and start data transmission over the selected access of the MA PDU session without receiving explicit indications from lower layer that user plane resources are established on 3GPP access and non-3GPP access. Similarly, once UE 101 receives the PDU SESSION MODIFICATION COMMAND message with ATSSS container IE (step 132), the UE can consider the MA PDU session has been converted from the SA PDU session and the user plane resources are successfully established on 3GPP access(the selected access), and start data transmission over 3GPP access(the selected access) of the MA PDU session without receiving explicit indications from lower layer that user plane resources are established on 3GPP access and non-3GPP access.

Figure 2:
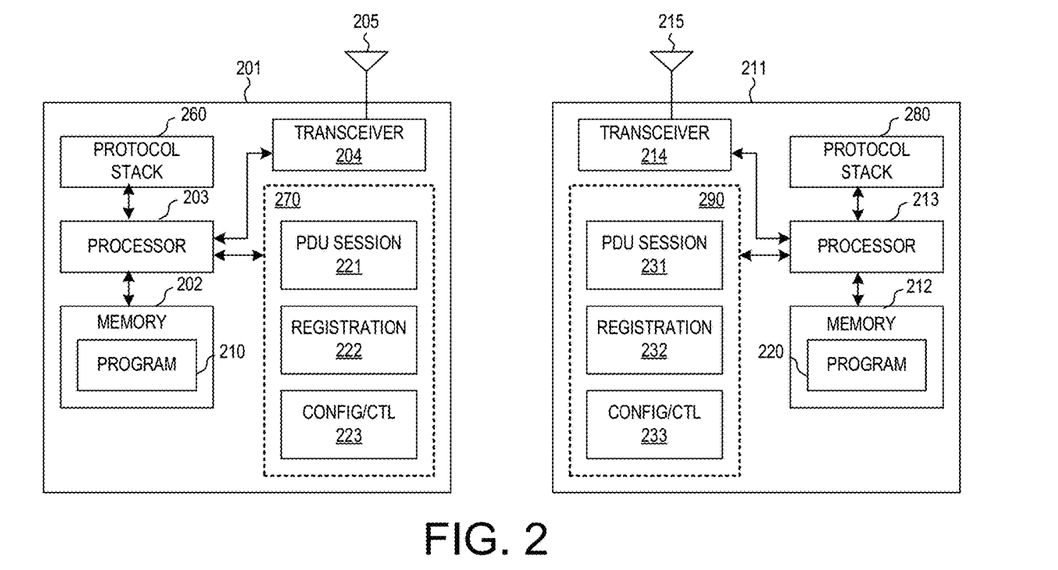
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control functional modules and circuitry 290.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuitry to carry out functional tasks of UE 201. Protocol stacks 260 comprise Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuitry 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network.

In one example, system modules and circuits 270 comprise PDU session handling circuit 221 that performs PDU session establishment and modification procedures with the network, a registration handling circuit 222 that performs registration with the network via 3GPP or non-3GPP access, and a config and control circuit 223 that handles configuration and control parameters for mobility management and session management. In one example, once the UE receives a PDU SESSION ESTABLISHMENT ACCEPT message with ATSSS container IE, or receives a PDU SESSION MODIFICATION COMMAND message with ATSSS container IE, the UE can consider the MA PDU session has been activated or converted and the user plane resources are successfully established on the selected access, and the UE can start data transmission over the selected access of the MA PDU session without receiving explicit indications that user plane resources are established on both 3GPP access and non-3GPP access.

Figure 3:
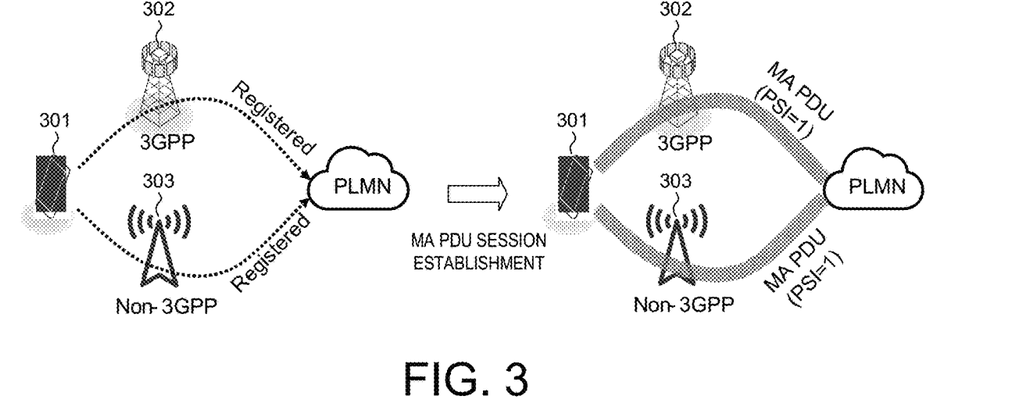
FIG. 3 illustrates one embodiment of establishing a MA PDU session in 5GS after a UE is registered to the network over both 3GPP and non-3GPP access type belonging to the same PLMN.

FIG. 3 illustrates one embodiment of establishing a MA PDU session in 5GS after a UE is registered to the network over both 3GPP and non-3GPP access type belonging to the same PLMN. UE 301 is registered over 3GPP access type to PLMN through a 3GPP base station gNB 302. UE 301 is also registered over non-3GPP access type to the same PLMN through a non-3GPP access point AP 303. UE 301 establishes a MA PDU session by initiating a PDU session establishment procedure with the network over either 3GPP or non-3GPP access type. The activation of the MA PDU connectivity service refers to the establishment of user-plane resources on both 3GPP access and non-3GPP access. Since UE 301 is registered to the network over both RAT access types belonging to the same PLMN, the MA PDU session with PSI=1 is established over both 3GPP and non-3GPP access types, and then user-plane resources are established on both 3GPP and non-3GPP access types. In one novel aspect, once the UE receives the PDU SESSION ESTABLISHMENT ACCEPT message with ATSSS container IE, the UE can consider the MA PDU session has been activated and the user plane resources are successfully established on the selected access, and start data transmission over the selected access of the MA PDU session without receiving explicit indications that user plane resources are established on 3GPP access and non-3GPP access.

Figure 4:
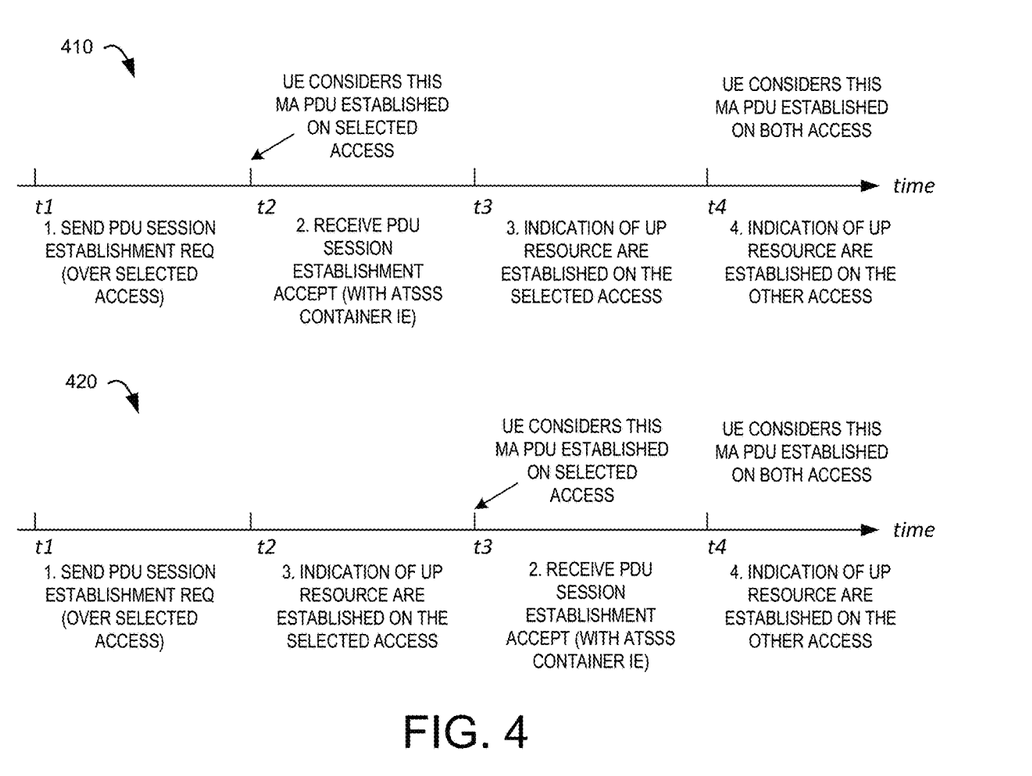
FIG. 4 illustrates one embodiment of MA PDU session establishment procedure and time lines when a UE can consider the MA PDU session has been activated for early data transmission.

FIG. 4 illustrates one embodiment of MA PDU session establishment procedure and time lines when a UE can consider the MA PDU session has been activated for early data transmission. A UE is registered to the network over both 3GPP and non-3GPP access types belonging to the same PLMN. As depicted by 410, at time t1, the UE establishes a MA PDU session by initiating a PDU session establishment procedure with the network over a selected access type. Specifically, the UE sends a PDU SESSION ESTABLISHMENT REQUEST message over the selected access to the network in order to activate an MA PDU session (PSI=1, type=MA PDU). At time t2, the UE receives a PDU SESSION ESTABLISHMENT ACCEPT message with ATSSS container IE from the network. At time t3, the UE receives an indication from lower layer (e.g., via an RRC reconfiguration message) indicating that user plane resources are established on the selected access. At time t4, the UE receives another indication from lower layer indicating that user plane resources are established on the other access. In this example, the UE receives the accept message at time t2, which is before receiving the first indication at time t3. Once the accept message is received at time t2, the UE considers that the MA PDU session has been activated and the user plane resources are successfully established on the selected access, and start data transmission over the selected access of the MA PDU session without waiting for both indications at time t3 and t4.

As depicted by 420, at time t1, the UE establishes a MA PDU session by initiating a PDU session establishment procedure with the network over a selected access type. Specifically, the UE sends a PDU SESSION ESTABLISHMENT REQUEST message over the selected access to the network in order to activate an MA PDU session (PSI=1, type=MA PDU). At time t2, the UE receives an indication from lower layer (e.g., via an RRC reconfiguration message) indicating that user plane resources are established on the selected access. At time t3, the UE receives a PDU SESSION ESTABLISHMENT ACCEPT message with ATSSS container IE from the network. At time t4, the UE receives another indication from lower layer indicating that user plane resources are established on the other access. In this example, the UE receives the accept message at time t3, which is after receiving the first indication at time t2. Once the accept message is received at time t3, the UE considers that the MA PDU session has been activated and the user plane resources are successfully established on the selected access, and start data transmission over the selected access of the MA PDU session without waiting for indication at time t4.

In another embodiment, after receiving the PDU session establishment accept message, if the UE has not received the second indication from the network, then the UE starts a timer to wait for the second indication. If the UE fails to receive the second indication from the network upon timer expiry, then the UE re-initiates the UE-requested PDU session establishment procedure by sending a PDU session establishment request message over the second access type, in order to establish user plane resources on the second access.

Figure 5:
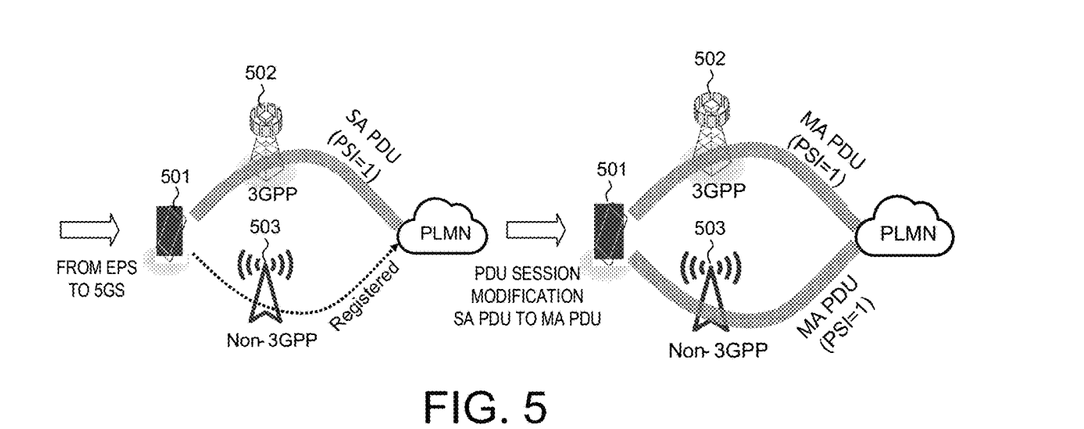
FIG. 5 illustrates one embodiment of converting an SA PDU session to an MA PDU session after intersystem change from EPS to 5GS.

FIG. 5 illustrates one embodiment of converting an SA PDU session to an MA PDU session after intersystem change from EPS to 5GS. A UE establishes a PDN connection is EPS. Upon intersystem change from EPS to 5GS, the PDN connection is mapped to a corresponding PDU session, e.g., SA PDU with PSI=1 over 3GPP access. Note that UE 501 is registered over 3GPP access type to PLMN through a 3GPP base station gNB 502. UE 501 is also registered over non-3GPP access type to the same PLMN through a non-3GPP access point AP 503. UE 501 then initiates a UE-requested PDU session modification procedure by sending a PDU SESSION MODIFICATION REQUEST message over 3GPP access (selected access) to the network in order to convert the SA PDU session to an MA PDU session. In the UL NAS TRANSPORT message (UL NAS TRANSPORT message contains the PDU SESSION MODIFICATION REQUEST message), UE may set the Request type IE to either 1) "modification request" and include the MA PDU session information IE set to "MA PDU session network upgrade allowed"; or 2) "MA PDU request". In one novel aspect, once the UE receives the PDU SESSION MODIFICATION COMMAND message with ATSSS container IE, the UE can consider the MA PDU session has been converted from the SA PDU session and the user plane resources are successfully established on 3GPP (the selected access), and start data transmission over 3GPP (the selected access) of the MA PDU session without receiving explicit indications from lower layer that user plane resources are established on 3GPP access and non-3GPP access.

Figure 6:
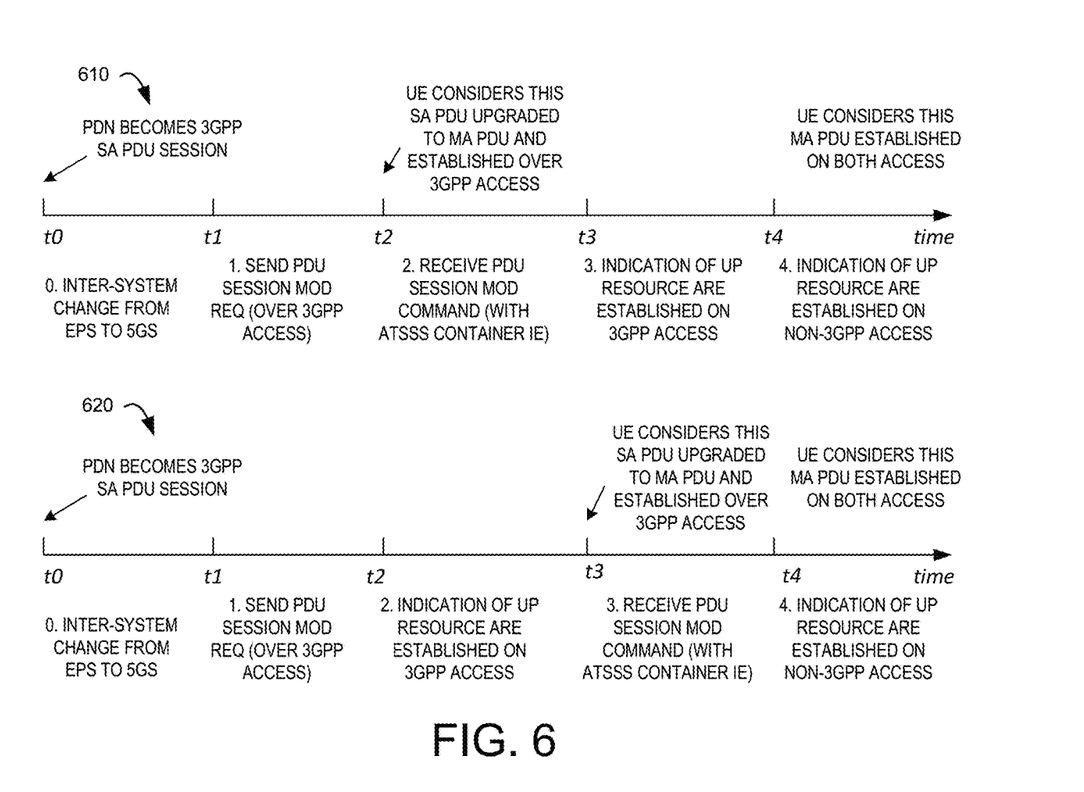
FIG. 6 illustrates one embodiment of MA PDU session modification procedure and time lines when a UE can consider the MA PDU session has been converted from an SA PDU session for early data transmission.

FIG. 6 illustrates one embodiment of MA PDU session modification procedure and time lines when a UE can consider the MA PDU session has been converted from an SA PDU session for early data transmission. A UE is registered to the network over both 3GPP and non-3GPP access types belonging to the same PLMN. As depicted by 610, at time t0, the UE performs intersystem change from EPS to 5GS, and a PDN connection is mapped to a corresponding SA PDU session. At time t1, the UE converts the SA PDU session to a MA PDU session by initiating a PDU session modification procedure with the network over 3GPP. Specifically, the UE sends a PDU SESSION MODIFICATION REQUEST message over the 3GPP access to the network in order to convert the SA PDU to the MA PDU. At time t2, the UE receives a PDU SESSION MODIFICATION COMMAND message with ATSSS container IE from the network. At time t3, the UE receives an indication from lower layer (e.g., via an RRC reconfiguration message) indicating that user plane resources are established on the 3GPP access. At time t4, the UE receives another indication from lower layer indicating that user plane resources are established on the non-3GPP access. In this example, the UE receives the command message at time t2, which is before receiving the first indication at time t3. Once the command message is received at time t2, the UE considers that the MA PDU session has been converted and the user plane resources are successfully established on the 3GPP access, and start data transmission over the 3GPP access of the MA PDU session without waiting for indications at time t3 and t4.

As depicted by 620, at time t0, the UE performs intersystem change from EPS to 5GS, and a PDN connection is mapped to a corresponding SA PDU session. At time t1, the UE converts the SA PDU session to a MA PDU session by initiating a PDU session modification procedure with the network over 3GPP. Specifically, the UE sends a PDU SESSION MODIFICATION REQUEST message over the 3GPP access to the network in order to convert the SA PDU to the MA PDU. At time t2, the UE receives an indication from lower layer (e.g., via an RRC reconfiguration message) indicating that user plane resources are established on the 3GPP access. At time t3, the UE receives a PDU SESSION MODIFICATION COMMAND message with ATSSS container IE from the network. At time t4, the UE receives another indication from lower layer indicating that user plane resources are established on the non-3GPP access. In this example, the UE receives the command message at time t3, which is after receiving the first indication at time t2. Once the command message is received at time t3, the UE considers that the MA PDU session has been converted and the user plane resources are successfully established on the 3GPP access, and start data transmission over the 3GPP access of the MA PDU session without waiting for explicit indication at time t4.

In another embodiment, upon receiving the PDU session modification command message, if the UE has not received the second indication from the network, then the UE starts a timer to wait for the second indication. If the UE fails to receive the second indication from the network upon timer expiry, then the UE re-initiates the UE-requested PDU session establishment procedure by sending a PDU session establishment request message over the second access type, in order to establish user plane resources on the second access.

Figure 7:
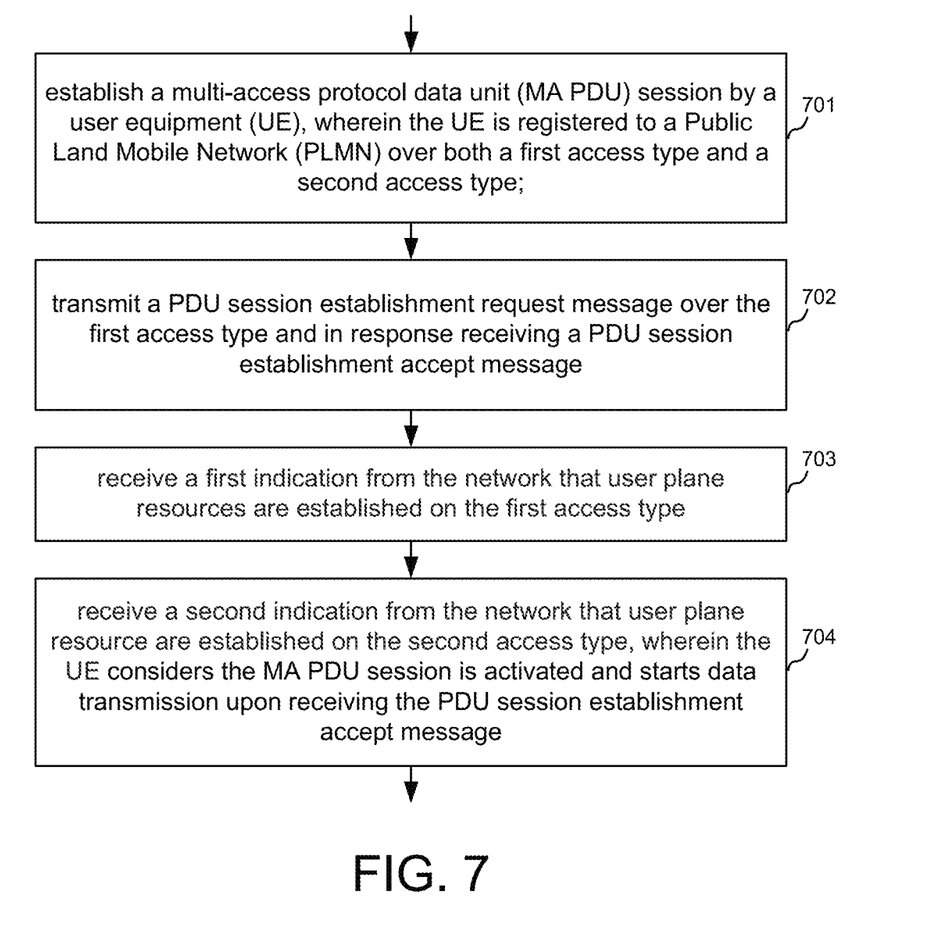
FIG. 7 is a flow chart of a method of handling multi-access (MA) Protocol data unit (PDU) session establishment for early data transmission in accordance with one novel aspect.

FIG. 7 is a flow chart of a method of handling multi-access (MA) Protocol data unit (PDU) session establishment for early data transmission in accordance with one novel aspect. In step 701, a UE establishes a multi-access protocol data unit (MA PDU) session. The UE is registered to a Public Land Mobile Network (PLMN) over both a first access type and a second access type. In step 702, the UE transmits a PDU session establishment request message over the first access type and in response receiving a PDU session establishment accept message. In step 703, the UE receives a first indication from the network that user plane resources are established on the first access type. In step 704, the UE receives a second indication from the network that user plane resource are established on the second access type, wherein the UE considers the MA PDU session is activated and starts data transmission upon receiving the PDU session establishment accept message.

Figure 8:
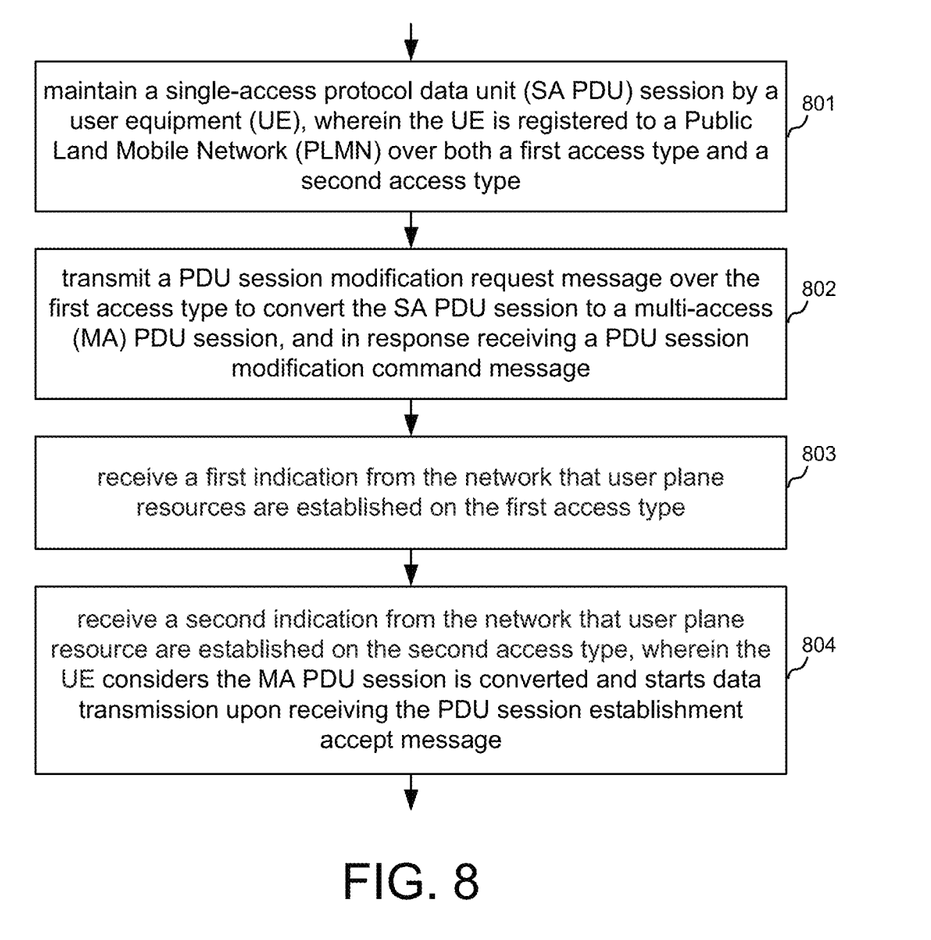
FIG. 8 is a flow chart of a method of handling multi-access (MA) Protocol data unit (PDU) session modification for early data transmission in accordance with one novel aspect.

FIG. 8 is a flow chart of a method of handling multi-access (MA) Protocol data unit (PDU) session modification for early data transmission in accordance with one novel aspect. In step 801, a UE maintains a single-access protocol data unit (SA PDU) session The UE is registered to a Public Land Mobile Network (PLMN) over both a first access type and a second access type. In step 802, the UE transmits a PDU session modification request message over the first access type to convert the SA PDU session to a multi-access (MA) PDU session, and in response receiving a PDU session modification command message. In step 803, the UE receiving a first indication from the network that user plane resources are established on the first access type. In step 804, the UE receives a second indication from the network that user plane resource are established on the second access type, wherein the UE considers the MA PDU session is converted and starts data transmission upon receiving the PDU session establishment accept message.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    establishing a multi-access protocol data unit (MA PDU) session by a user equipment (UE), wherein the UE is registered to a Public Land Mobile Network (PLMN) over both a first access type and a second access type;
    transmitting a PDU session establishment request message over the first access type;
    receiving a PDU session establishment accept message, wherein the UE considers the MA PDU session is activated and considers the user plane resources are established on the first access based on the PDU session establishment accept message, and wherein the UE starts PDU data transmission over the first access type upon receiving the PDU session establishment accept message; and
    starting a timer upon receiving the PDU session establishment accept message, wherein the UE re-initiates a UE-requested PDU session establishment procedure over the second access type when the UE has not received a notification for the second access type upon timer expiry.

2. The method of claim 1, wherein the PDU session establishment accept message comprises an Access Traffic Steering Switching and Splitting (ATSSS) Container IE.

3. The method of claim 1, wherein the UE considers the user plane resources are established on the second access subsequently.

4. The method of claim 3, wherein the UE starts the data transmission over the second access type.

5. A User Equipment (UE), comprising:
    a protocol data unit (PDU) session handling circuit that establishes a multi-access PDU (MA PDU) session, wherein the UE is registered to a Public Land Mobile Network (PLMN) over both a first access type and a second access type; and
    a transmitter that transmits a PDU session establishment request message over the first access type and in response receiving a PDU session establishment accept message; wherein the UE considers the MA PDU session is activated and considers the user plane resources are established on the first access based on the PDU session establishment accept message, and wherein the UE starts PDU data transmission over the first access type upon receiving the PDU session establishment accept message, and starts a timer upon receiving the PDU session establishment accept message, wherein the UE re-initiates a UE-requested PDU session establishment procedure over the second access type when the UE has not received a notification for the second access type upon timer expiry.

6. The UE of claim 5, wherein the PDU session establishment accept message comprises an Access Traffic Steering Switching and Splitting (ATSSS) Container IE.

7. The UE of claim 5, wherein the UE considers the user plane resources are established on the second access subsequently.

8. The UE of claim 7, wherein the UE starts the data transmission over the second access type.

9. A method, comprising:
    maintaining a single-access protocol data unit (SA PDU) session by a user equipment (UE), wherein the UE is registered to a Public Land Mobile Network (PLMN) over both a first access type and a second access type; and
    transmitting a PDU session modification request message over the first access type to convert the SA PDU session to a multi-access (MA) PUD session, and in response receiving a PDU session modification command message, wherein the UE considers the MA PDU session is converted and considers the user plane resources are established on the first access based on the PDU session establishment accept message, and wherein the UE starts PDU data transmission over the first access type upon receiving the PDU session modification command message; and
    starting a timer upon receiving the PDU session modification command message, wherein the UE re-initiates a UE-requested PDU session establishment procedure over the second access type upon timer expiry.

10. The method of claim 9, wherein the PDU session modification command message comprises an Access Traffic Steering Switching and Splitting (ATSSS) Container IE.

11. The method of claim 9, wherein the UE considers the user plane resources are established on the second access.

12. The method of claim 11, wherein the UE starts the data transmission over the second access type subsequently.

* * * * *